No. 858,986. PATENTED JULY 2, 1907.
K. E. JOHANSSON.
ANIMAL TRAP.
APPLICATION FILED MAR. 22, 1907.
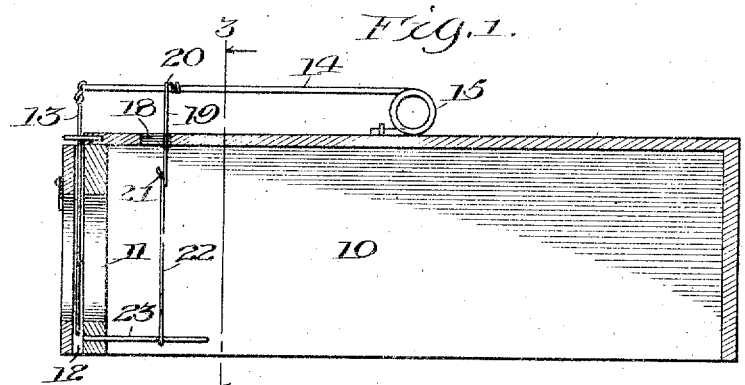
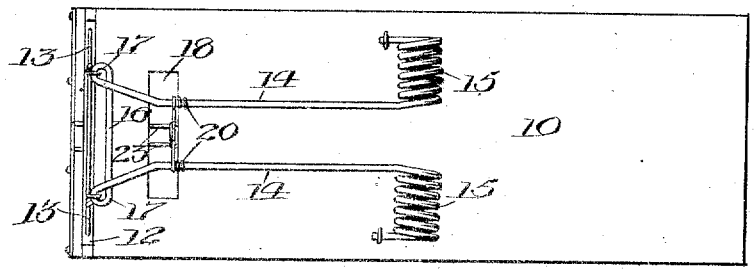
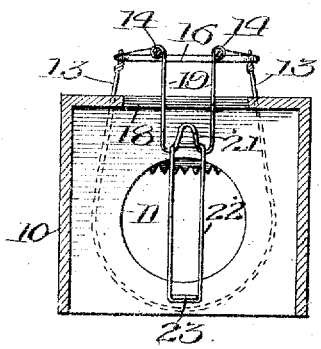
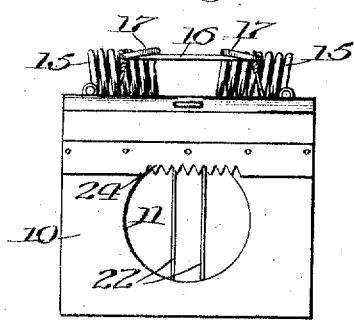
Witnesses
O. M. Mennie
M. A. Nyman
Inventor
Karl E. Johansson.
by Chas. C. Tillman atty

UNITED STATES PATENT OFFICE.

KARL E. JOHANSSON, OF CHICAGO, ILLINOIS.

ANIMAL-TRAP.

No. 858,986.

Specification of Letters Patent.

Patented July 2, 1907.

Application filed March 23, 1907. Serial No. 363,801.

*To all whom it may concern:*

Be it known that I, KARL E. JOHANSSON, a subject of the King of Sweden, residing at Chicago, in the county of Cook and State of Illinois, have invented certain new and useful Improvements in Animal Traps, of which the following is a specification.

This invention relates to improvements in that class of animal traps, in which a spring-actuated or twitch-up loop or snare, in connection with an apertured cage or casing, is employed, to catch and bodily hold the animals, and while it is more especially intended and designed for trapping animals of the rodent family, such as rats and mice on account of their peculiar habits of gnawing obstructions to their passage, yet it is applicable for use in trapping other animals; and it consists in certain peculiarities of the construction, novel arrangement, and operation of the various parts thereof, as will be hereinafter more fully set forth and specifically claimed.

The object of the invention is to provide an animal trap, which shall be simple and inexpensive in construction, strong, durable and effective in operation, with its parts so made and arranged that when the trap is set for operation an obstruction will be located in such a way, near the opening in the casing or cage of the trap, as to prevent the animal entering and so as to offer to the animal, on account of its desire and habit to gnaw away obstructions, a further inducement other than the bait which may be placed in the cage or casing to spring the trap or rather to release the loop or snare.

Other objects and advantages of the invention will be disclosed in the subjoined description and explanation.

In order to enable others skilled in the art to which my invention pertains, to make and use the same, I will now proceed to describe it, referring to the accompanying drawing, in which—

Figure 1 is a central longitudinal sectional view, showing the parts of the trap set or ready for operation to bodily catch an animal. Fig. 2 is a top plan view of the trap. Fig. 3 is a cross-sectional view taken on line 3—3 of Fig. 1 looking in the direction indicated by the arrows; and Fig. 4 is a front end view of the trap when the parts are arranged as shown in Fig. 1.

Like numerals of reference, refer to corresponding parts throughout the different views of the drawing.

The reference numeral 10 designates a box-like cage or casing, which may be made of any suitable size, form and material, but preferably rectangular in shape, as shown, and of wood or metal, and has in one of its ends an opening 11, of any suitable form and size best adapted for the kind of animals desired to be caught. As is clearly shown in Figs. 1 and 2 of the drawing, that end of the casing or cage in which the opening 11 is formed is provided with a vertical guide-way 12, which extends from the top of the cage to the bottom or lower portion thereof and across the same, and is for the guidance of the loop or snare 13, which is preferably made of wire and of sufficient size to surround the opening 11 when in its lowered or set position.

The upper ends of the loop or snare 13 are connected to the springs members 14 at one of their ends, which members are formed near their other ends into coiled springs 15 which are secured to the top of the cage 10 and usually on the upper surface thereof. As shown in Figs. 2 and 3 of the drawing, the spring members 14 extend in parallelism from the springs 15, which actuate said members to near that end of the cage in which the guide-way 12 is formed, and that said members are united at their free ends by means of a cross-piece or portion 16, which is integral with said members, thus causing them to act in unison. To form the cross-piece or portion 16, the members 14 are bent transversely at their free ends, thus providing loops 17 on which the upper ends of the snare or loop 13 is secured, in a manner to prevent them sliding together or apart. The top of the cage or casing is formed near the end thereof in which the opening 11 is located with a transverse slot 18, for the passage and operation of a trigger loop 19, the upper ends of which are adjustably secured on the spring members 14, as at 20, and usually by twining the ends of the loop 19 around said members. The lower portion of the trigger loop 19 is provided with an upwardly bent projection 21, around which a cord, thread or other easily destroyed obstruction 22 in the form of a loop is extended, the lower portion of which cord or obstruction is passed around a projection 23, which is located horizontally below the opening 11 in one end of the cage and is secured at one of its ends thereto. This projection 23, is preferably in the form of two parallel wires, as shown in Fig. 2, so that the strands of the obstruction 22 will thereby, and on account of the form of the projection 21, be separated sufficiently to prevent the passage of the animal through the opening 11 without obstruction. It will be noted by reference to Figs. 1 and 2 that the transverse slot 18 is of sufficient width to permit the trigger loop 19 to be moved back and forth, or adjusted on the spring members 14, so that the obstruction 22 may be located nearer to or farther from the inner surface of the end of the cage in which the opening 11 is formed, to adapt the trap for animals of different sizes, for it is evident that if the trap is designed to catch mice the obstruction 22 should be located very close to the inner surface of said end of the casing, and if it is desired to catch larger animals the obstruction should be located further from said end, in order that the snare or loop 13 may surround a portion of its body. That end of the casing or cage in which the opening 11 is formed has transversely and horizontally secured thereon, and across the upper portion of the opening 11, a serrated strip 24, which will assist the snare or loop 13 in firmly holding the animal after it has been caught.

After the trap has been set, which is performed by pressing the spring members 14 downwardly so that the snare or loop 13 will surround the opening 11 and fastening the trigger loop 19 to the projection 23 by means of a string or thread 22, it is apparent that as the animal attempts to enter the opening 11 it will encounter the obstruction 22, and if the animal is of the rodent tribe it will gnaw the string or obstruction 22, thus releasing the spring members and thereby causing the snare or loop 13 to catch the body of the animal between its lower portion and the upper part of the opening 11 in the cage. If the animal is not of the rodent family or is not given to gnawing obstructions, it is evident that in its attempt to enter the cage through the opening 11 it will displace the cord or string 22 from the projection 23, when the spring members will be released and the same operation, as above described, will take place.

Having thus fully described my invention, what I claim as new, and desire to secure by Letters-Patent, is—

In an animal trap, the combination with a casing having an entrance opening for the animal in one of its walls and provided in its top with a transverse slot, of springs secured on the upper surface of the casing and each having a member extended towards the wall of the casing in which the entrance opening is formed, said members lying in parallelism and having their free ends united by a cross portion, a loop secured at its ends to the free ends of the spring members and adapted to surround the entrance opening in the casing, a trigger loop adjustably secured at its upper ends on the spring members and extended through the opening in the top of the casing, an inwardly extending projection located below the entrance opening of the casing, and an obstruction uniting the lower portion of the trigger loop and the said projection, substantially as described.

KARL E. JOHANSSON.

Witnesses:
CHAS. C. TILLMAN,
M. A. NYMAN.